United States Patent [19]

Schlapfer

[11] Patent Number: 5,616,847
[45] Date of Patent: Apr. 1, 1997

[54] SENSOR FOR EXPANSION MEASUREMENT

[76] Inventor: Bruno Schlapfer, Oberschneit, CH-8523 Hagenbuch, Switzerland

[21] Appl. No.: 524,243

[22] Filed: Sep. 6, 1995

[51] Int. Cl.$^6$ ..................................................... G01B 7/16
[52] U.S. Cl. .............................................. 73/774; 73/764
[58] Field of Search ........................... 73/766, 764, 765, 73/774, 775, 781, 855, 856, 818

[56] References Cited

U.S. PATENT DOCUMENTS

| | | | |
|---|---|---|---|
| 3,240,207 | 3/1966 | Barker et al. | 73/766 |
| 3,791,205 | 2/1974 | Hooker | 73/781 |
| 3,820,529 | 6/1974 | Cause et al. | 73/774 |
| 3,889,381 | 6/1975 | Brown | 33/179 |
| 4,023,054 | 5/1977 | Taytor | 73/774 |
| 4,600,347 | 7/1986 | Segredo et al. | 73/774 |
| 5,284,062 | 2/1994 | Ryffel . | |

FOREIGN PATENT DOCUMENTS

| | | |
|---|---|---|
| 2537369 | 3/1977 | Germany . |
| 2831939 | 2/1979 | Germany . |
| 3010168 | 9/1981 | Germany . |

Primary Examiner—Richard Chilcot
Assistant Examiner—Max H. Noori
Attorney, Agent, or Firm—Bachman & LaPointe, P.C.

[57] ABSTRACT

A sensor which can be held around a cylindrical body has elastic parts which have expansion-sensitive elements on the inner surfaces. The elastic parts are pressed against the cylinder surface under high pressure by bracing the two sensor halves, such that the expansion-sensitive elements engage the cylinder surface by friction force and thus can detect the surface expansion occurring.

The expansion-sensitive elements are protected against mechanical influences. Thus expansion measurement strips can be applied to the cylinder surface without adhesive and can be used several times.

13 Claims, 3 Drawing Sheets

SENSOR FOR EXPANSION MEASUREMENT

BACKGROUND OF THE INVENTION

The present invention concerns a sensor for electric measurement of positive and negative expansion of cylindrical bodies.

Expansion sensors are known which by means of a cylindrical elastic body press expansion measurement strips onto the surface of a drilled hole and measure the expansion of the hole surface directly by friction force and thus can measure the stresses in cylindrical bodies.

Other systems used today have measurement bridges, with blades with constant spacing held by belts or magnets against the surface of cylindrical bodies, and thus measure the expansion occurring.

The first expansion sensors above have the disadvantage that a hole must be drilled. The second solution explained above is very exposed, slips easily and is therefore not suitable for industrial use.

SUMMARY OF THE INVENTION

The purpose of this invention is to produce a sensor of the first type described above which acts with simple and reliable friction force and avoids the previous disadvantages.

This task is solved by the invention in that recesses are provided on a divided flange, which recesses are filled with elastic material, on the said flange are arranged elements generating electric signals which elements can be pressed so strongly onto a cylindrical body by means of bracing mechanisms that the expansion of the surface of the cylindrical body can be transferred by friction to the expansion-sensitive elements, and thus the stresses and forces acting on the cylindrical body can be assessed directly and without transfer losses.

The sensors according to the invention ideally have two halves of an annulus in which are arranged, usually on the inside, two elastic elements with attached measuring elements. The internal diameter of the two annulus halves when joined is preferably slightly larger than the external diameter of the cylindrical body.

If the two annulus halves are pressed onto the cylindrical body by appropriate means, the elastic elements with the measuring elements press on the surface of the cylindrical body and measure the expansion occurring there.

The expansion sensor can therefore be mounted quickly without drilling, and the measuring elements protected and mounted vibration-free. No measuring system previously known has these advantageous properties.

BRIEF DESCRIPTION OF THE DRAWINGS

The sensor according to the invention is described in more detail below on the basis of design examples which also form the subject of dependent claims. The figures show:

DETAILED DESCRIPTION OF PREFERRED EMBODIMENTS

Figure 1:
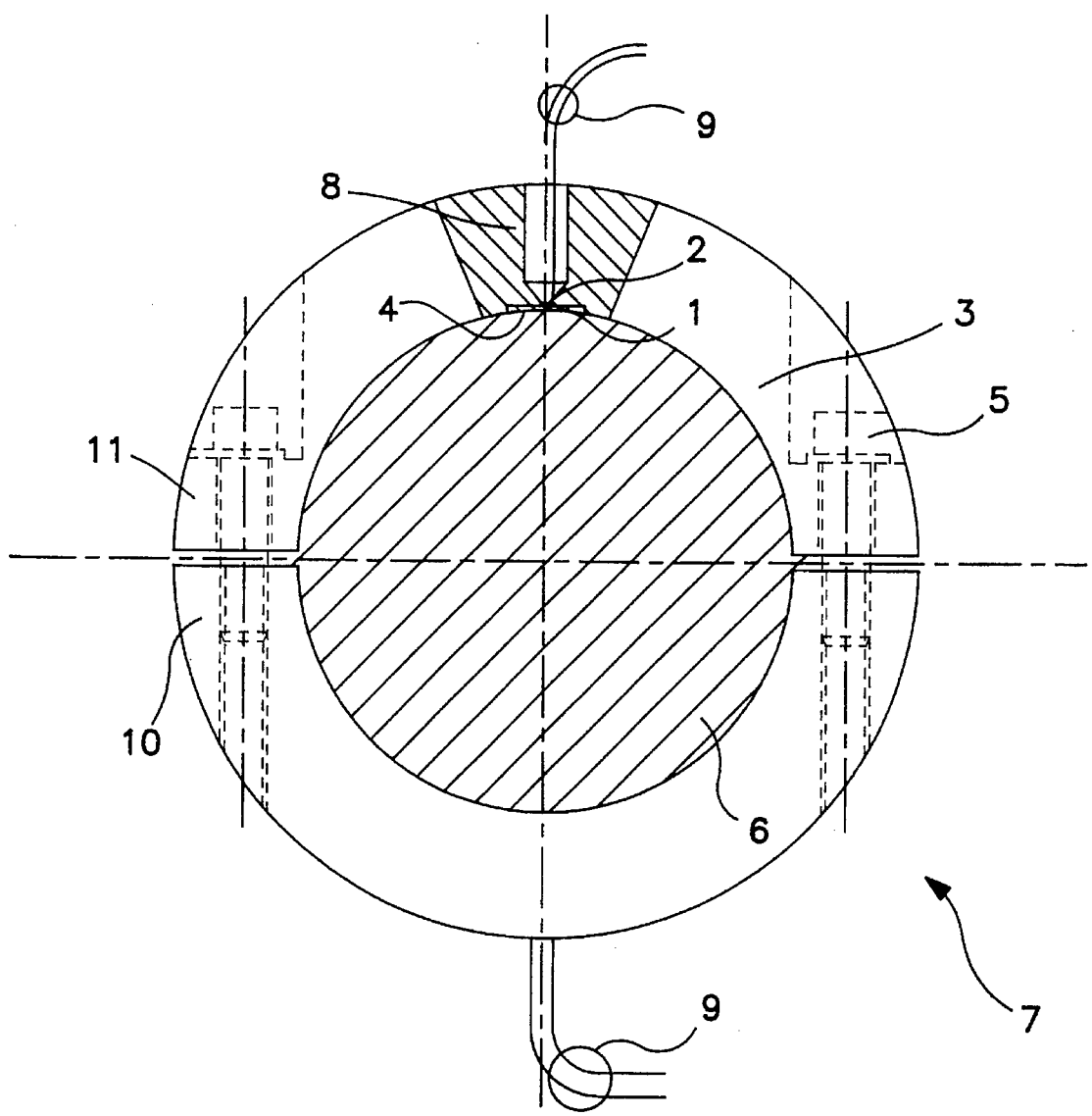
FIG. 1 a radial section through a preferred design form of a sensor according to the invention in the installed position, FIG. 2 a radial section through a variant of the sensor according to the invention with integral analysis electronics, FIG. 3 a perspective view of a sensor.

An expansion sensor 7 is shown in FIG. 1 screwed to a cylindrical body 6. The cylinder 6 can be solid or tubular. The sensor 7 comprises a mounted flange 3 divided in two parts and must be able to be pressed against the cylindrical body 6 by means of a suitable mechanism, here a screw 5, where elastic parts 2 which are arranged in recesses 4 press on the surface of the body 6 with considerable force. The two parts 10 and 11 of the sensor 7 can be formed semicircular as shown in FIG. 1 or as bars.

It is important that the internal diameter of the sensor 7 is slightly larger than the external diameter of the cylindrical body 6 to be measured, and that the elastic part 2 is raised slightly over the internal diameter and thus can be compressed without difficulty.

The pressure on the expansion-sensitive elements 1 must be sufficiently high for an adherence-actuated engagement, in other words a friction engagement, to be created between the said elements and the surface of the body. Thus forces acting on the body and causing expansion are measured by means of the expansion-sensitive elements 1. The elements are protected against mechanical damage and are mounted to be vibration-free.

Additional mechanical protection for the expansion-sensitive elements 1 can be provided by a metal foil, not shown, which is drawn over the elastic elements and attached to an inner ring by suitable means, for example gluing, soldering, welding, riveting or screwing.

The signal cables 9 run through the elastic part 2 and the hole 8 to the analysis electronics. The signal cables 9 can also run out in an axial direction in a similar manner.

Figure 2:
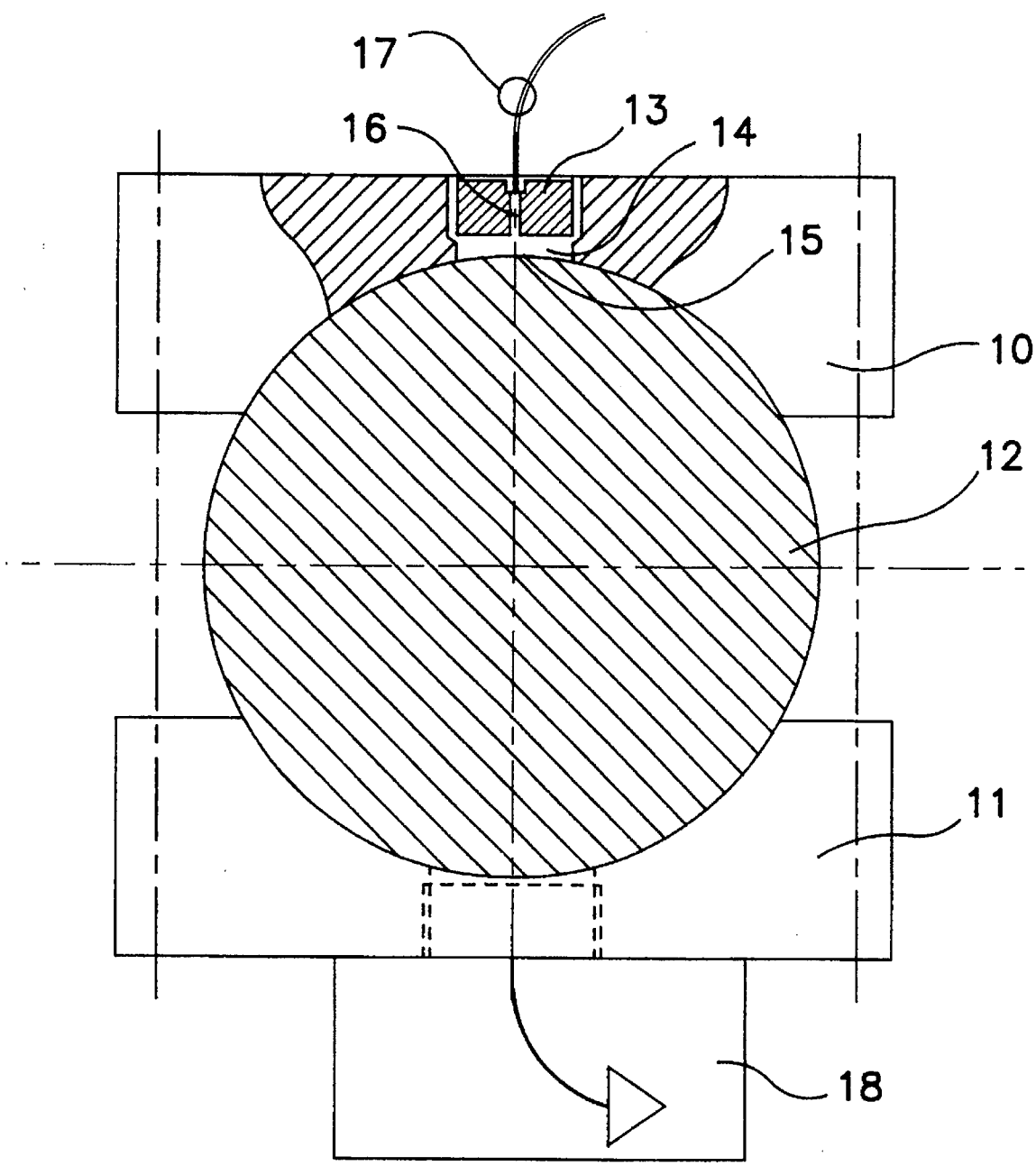

FIG. 2 shows a variant of the sensor according to the invention. The two halves 10 and 11 are here formed as bars with recesses in the form of segments of a circle. The two halves are held around the cylinder 12 by suitable means.

The expansion-sensitive elements 1, usually in the form of expansion strips, may be smaller, as large as, or larger than the elastic part 2. They are preferably metal-coated or vapor-metallized on the contact side such that the protective function of the metal foil is integral in this case.

In a further preferred design form, the expansion-sensitive elements 1 are piezo foils.

To assess longitudinal and transverse expansion, the expansion measurement strips are arranged in approximately axial and radial directions and are thus also temperature-compensated.

To measure torsion stresses on bodies with surfaces in the shape of a cylinder casing, the expansion measurement strips are preferably arranged at an angle of approximately 45° to the axis of the cylindrical body 6.

Elastic elements 14 with expansion-sensitive elements 15 are inserted in two radial bores 13 and held by means of a nipple 16 or similar, and are thus pressed against the cylinder surface such that the expansion occurring on the cylinder is assessed and passed via signal cable 17 through the elastic element 14 and the nipple 16 to analysis electronics 18.

The analysis electronics 18 can be integrated into the sensor, mounted directly on the sensor, or at another suitable point.

Figure 3:
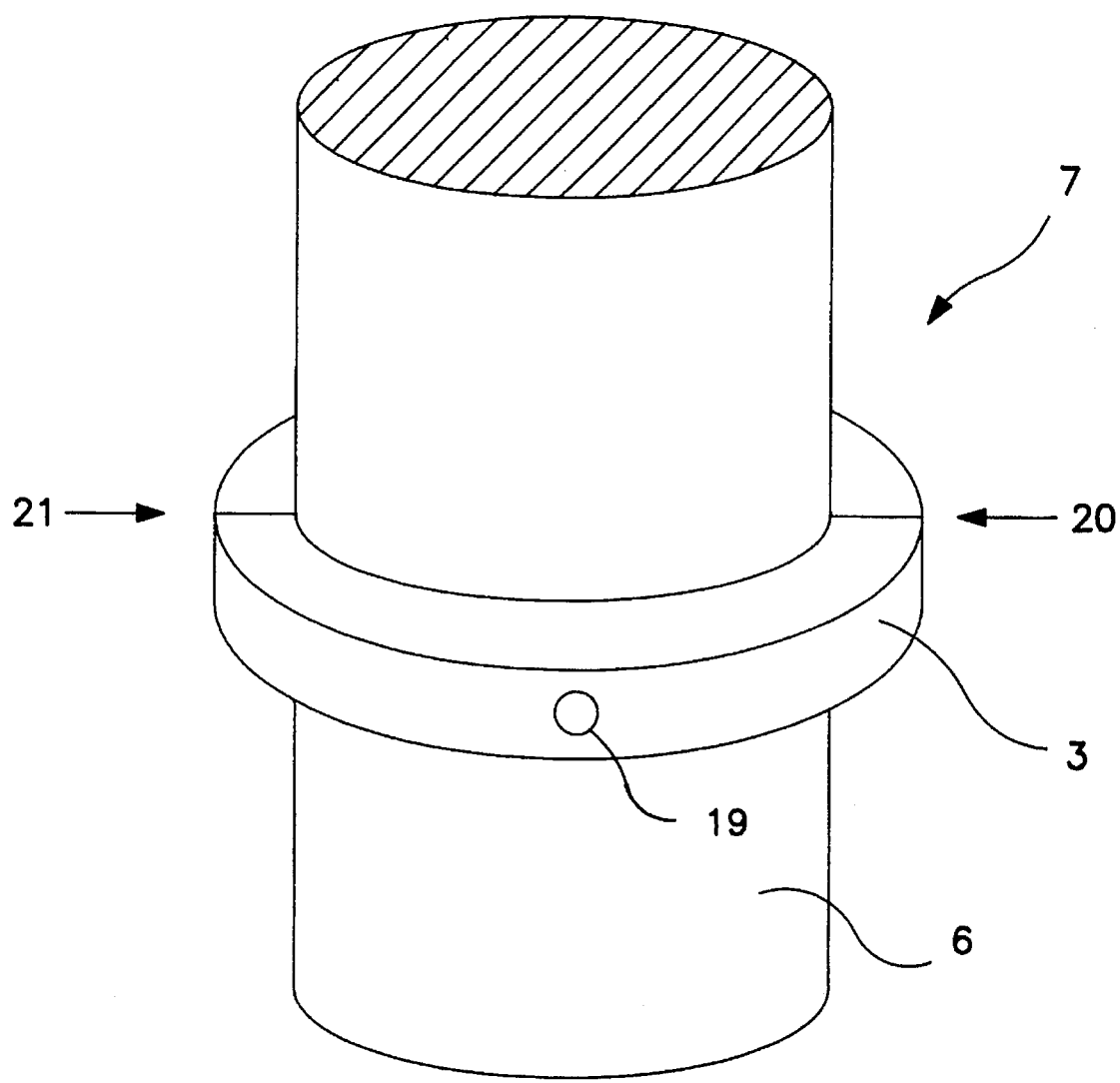

FIG. 3 shows a sensor 7 of the type described above in a three-dimensional view from the outside. The sensor 7 is clamped to the cylinder 6. The signal cable 19 carries the already amplified expansion signals to the display and analysis electronics. In the case shown, the analysis electronics are very small and fully integrated into the sensor 7.

In the variant of the invention according to FIG. 3, there is provided a joint 20 and a fast-coupling or screw 21, in order to simplify the installation.

The invention provides the possibility of applying expansion measurement strips to surfaces without glue so that thanks to the simple time-saving mounting, new technical steps are available.

I claim:

1. Sensor for electrical measurement of positive and negative expansions of cylindrical bodies, which comprises:
a cylindrical body having a surface; a divided flange adjacent said cylindrical body; recesses on the divided flanges; elastic material in said recesses; expansion-sensitive elements on said flange generating electrical signals; bracing mechanisms operatively associated with said flange which press said elements directly and strongly onto said cylindrical body so that the expansion of the surface of the cylindrical body can be transferred by friction to the expansion-sensitive elements, and thus the stresses and forces acting on the cylindrical body can be assessed directly and without transfer losses.

2. Sensor according to claim 1, wherein the expansion-sensitive elements can be pressed onto the cylindrical body by means of an elastic part and a nipple to create a friction engagement between the expansion-sensitive elements and the cylindrical body.

3. Sensor according to claim 1, including a removable measuring unit installed in said flange.

4. Sensor according to claim 1, wherein the expansion-sensitive elements and the elastic material are protected with a metal foil.

5. Sensor according to claim 1, wherein the expansion-sensitive elements are expansion measurement strips having a contact side, which are metal-coated or vapor-metallized on the contact side.

6. Sensor according to claim 1, wherein the expansion-sensitive elements are piezo foils.

7. Sensor according to claim 1, wherein the expansion-sensitive elements are expansion measurement strips arranged in an approximately axial or radial direction and can thus detect longitudinal or transverse expansion and thus are also temperature compensated.

8. Sensor according to claim 1, wherein the cylindrical body has an axis, and wherein the expansion-sensitive elements are expansion measurement strips arranged at an angle of approximately 45° to the axis of the cylindrical body and can thus measure torsion stress on the cylindrical body.

9. Sensor according to claim 1, wherein the flange halves are designed as rings or bars with recesses in the diameter which correspond at least to the cylinder to be measured.

10. Sensor according to claim 1, wherein said flange is held around the cylinder by a fast-coupling.

11. Sensor according to claim 1, wherein said flange is held around the cylinder by a joint and a screw.

12. Sensor according to claim 1, wherein the divided flange has an internal diameter, and the cylindrical body has an external diameter, and wherein the internal diameter of the divided flange is slightly larger than the external diameter of the cylindrical body.

13. Sensor according to claim 1, wherein said elements are provided in said recesses.

* * * * *